Dec. 13, 1927.
W. M. INGRAM
1,652,626
AIR PUMP CONNECTION
Original Filed Aug. 24, 1923
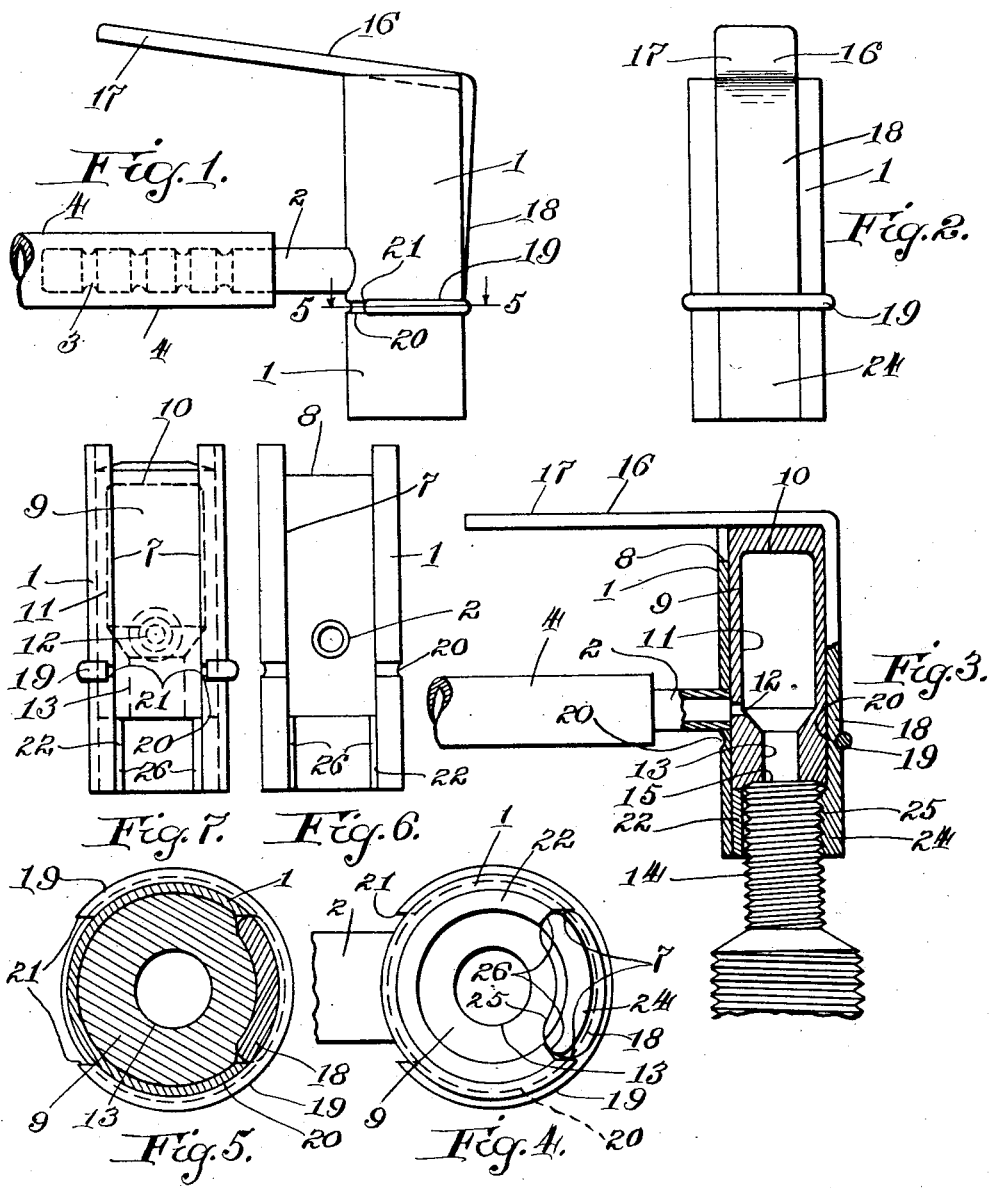

Patented Dec. 13, 1927.

1,652,626

UNITED STATES PATENT OFFICE.

WALTER M. INGRAM, OF BALTIMORE, MARYLAND, ASSIGNOR TO SPENCER S. UNGLAUB.

AIR-PUMP CONNECTION.

Application filed August 24, 1923, Serial No. 659,047. Renewed May 9, 1927.

The difficulties incident to attaching and detaching the ordinary screw coupling in connecting and disconnecting the air pump or compressed air supply in inflating automobile tires, are well understood. These difficulties result from the tendency of the threads on the valve tube to become jammed or stripped from lack of protection, or filled with dirt or otherwise rendered inoperative, and from the necessity for accurately engaging the threads, resulting in delay and finally an imperfect connection in almost every instance when the tube and valve stem have been in use for any considerable period.

The present invention relates to an improved automatic coupling, which is instantaneously attached and detached, dispensing with the screw connection, and which is so constructed that the air pressure when applied tends to tighten the grip of the coupling and to improve the connection by pressing the packing, which is a part of the device, into closer contact with the end of the valve tube than when originally engaged.

The present device also has the advantage that the nozzle or connection is turned at right angles to the hose or tube, making it possible to reach conveniently the valve stems which are otherwise difficult of access. Also, the coupling is lever operated, the lever being parallel to the hose, so that it is unnecessary to thrust the hand or fingers between the spokes or into the confined space in the vicinity of the valve stem in order to make the connection.

The device also has the advantages that it is simple and capable of being quickly produced at a small cost in large quantities without expensive labor, and that it is easily taken down and assembled for purposes of replacement of the parts.

In the accompanying drawing I have illustrated an air pump hose connection or coupling embodying the features of my invention in the preferred form.

In the drawings Figure 1 is a side elevation of the coupling or hose connection.

Figure 2 is an elevation looking at the device from the right in Figure 1.

Figure 3 is a central section taken on a plane parallel to the plane of Figure 1.

Figure 4 is a bottom plan.

Figure 5 is a section on the line 5, 5 of Figure 1.

Figure 6 is an elevation looking from the right in Figure 1, showing the body portion of the coupling with the packing member, the clamping lever and ring removed.

Figure 7 is a similar view showing the ring rotated to releasing position, as hereinafter described, the packing member and clamping lever being omitted.

Referring to the drawings by numerals, which are used to indicate the same or similar parts in the different figures, the hose connection illustrated includes a tubular body member 1, having connected thereto laterally a tubular shank 2, corrugated or grooved at 3 to be gripped by the end of a rubber or similar hose 4, the tubular body member having a slot 7 parallel to the axis and opposite to the shank 2, and shown as extending the entire length of the body member, whereby a considerable arc shown as substantially a quarter of its diameter is removed or omitted.

Preferably the body member is also provided with a shallow slot 8 extending downward from the top, opposite and equal in width to the slot 7.

Having particular reference to Figure 3, I have shown the body member 1 as provided with a rubber or similar packing member 9 which fits closely within the body member, being closed at the top at 10 and being hollow, forming an air pressure chamber 11, to which air is admitted from the hose 4 by way of the tubular shank 2 through a lateral aperture 12. The packing member 9 has an opening or passageway 13 leading from the lower end, which opening is intended to register with the valve tube 14, the edges of the opening 13 being thickened to provide a suitable packing surface for engagement with the end 15 of the valve 2.

The slot 7 in the tubular body member serves as a seat for the gripping lever 16, which, as shown, is bent at right angles, forming two arms 17 and 18, the latter occupying the slot 7 and the former being guided and positioned by the short slot 8. The lever 16 is pivoted intermediately of the upright arm 18, upon a ring 19, shown as made of round wire seated in a circumferential groove 20 in the outer surface of the body member 7, the ring being as shown, slotted or split at 21 to provide for release of the lever 16 when the split 21 in the ring is brought into registration with the slot 7.

In the form of the invention illustrated I have shown a split bushing 22 in the lower end of the tubular body member, serving to hold the packing member 9 in position and to engage the valve tube 15, which latter is gripped in the operation of the device by the lower end 24 of the arm 18 of the gripping lever 16, the said lower end of the lever being preferably provided with notches 25 to engage the thread 14 on the valve tube, the tendency to grip the valve tube being imparted to the lever 16 by the packing member 9, the resiliency of which acts as a spring tending to force the upper end of the lever arm 18 outward and the lower end 24 inward against the valve stem.

In operation the lever arm 17 being pressed downwardly or pinched toward the hose 4, the hose and lever being gripped between the thumb and finger, the lower end 24 of the lever arm 18 is swung outwardly, the packing member 9 being compressed. The hose coupling is then passed over the end of the valve tube, the latter entering the bushing 22, and on release of the gripping lever, the end of the valve tube is held in this position, having its end 15 in more or less close contact with the packing member about the aperture 13, the lower end 24 of the arm 18 of lever 16 entering the slots 26 in the bushing 22 and being pressed against the valve tube by this action of the rubber packing.

The hose 13 is understood to be in connection with a pump or other supply of compressed air, and on entrance of the compressed air into the chamber 11 in the packing member, particularly when there is a considerable back pressure due to the seating of the tire valve or due to the accumulation of air under pressure in the tire, so that there is a tendency to blow the coupling off of the valve tube, the packing member 9 is expanded due to this pressure, applying a considerable pressure to the gripping lever 16, tending to rotate the same right-handed about the ring 19 and gripping the valve stem tightly, and, further, the expansion of the packing member or compression of the same, due to the air pressure from within, presses and expands the thickened portions 13 downwardly into closer contact with the end 15 of the valve tube 14, so that the greater the back pressure and the pressure accumulated in the tube and coupling, the greater the tendency to blow the coupling off of the tube and the greater the tendency to leakage about the tube, the tighter the coupling grips the tube and the greater the resistance to such leakage, i. e., the closer the packing contact.

Having reference to the apparatus as assembled, shown in Figures 3, 4 and 7, it will be apparent that the gripping lever may be removed by merely rotating the ring 19 in the groove 20 until the split 21 therein comes over the slot 7, and the arm 18 of the lever 16, releasing the latter and making it feasible to withdraw the bushing 22 and the packing member 9.

It will be appreciated that the pump connection thus described is easily applied to the valve tube and disconnected therefrom without regard to the condition of the thread, and that it is most efficient as to ease and quickness of operation, and as to the tightness of the connection thus achieved, and, further, that it is exceedingly simple in construction and not apt to get out of order, and that it is capable of cheap manufacture and can be produced quickly in large quantities.

I have thus described specifically and in detail a single embodiment of my invention in order that the nature and operation of same may be clearly understood. However, the specific terms herein are used descriptively rather than in a limiting sense, the scope of the invention being defined in the claims.

What I claim and desire to secure by Letters Patent is:

1. A hose connection for pneumatic tires and the like, having a hollow body member, a gripping lever pivoted thereon, and a hollow resilient member within said body member inflated by the air pressure and serving as a spring to actuate the gripping lever.

2. A hose connection for pneumatic tires and the like, having a hollow body member, a gripping lever pivoted thereon, and a hollow resilient member within said body member serving as a spring to actuate the gripping lever, the hollow resilient member being connected to the hose, and being inflated by the air passing through the coupling, increasing the actuating pressure applied to the coupling lever.

3. A hose connection for pneumatic tires and the like, having a hollow body member, a gripping lever pivoted thereon, and a hollow resilient member within said body member serving as a spring to actuate the gripping lever, the hollow resilient member having a packing surface and being connected to the hose, so that it is inflated by the material passing through the hose, increasing the contact pressure of the packing surface.

4. A hose coupling for engagement with an automobile tire valve, consisting of a tubular body member having a slot, a gripping lever engaging said slot, a pivot for said lever, a flexible hollow member within the body member and connected to the hose, and engaging the gripping lever, tending to swing the latter around its pivot, the fluid pressure on said hollow member increasing the gripping action of the lever.

5. A hose coupling for engagement with an automobile tire valve, consisting of a tubular body member having a slot parallel to the axis, a gripping lever in said slot, a pivot for said lever at right angles to the said axis, a flexible hollow member within the body member and connected to the hose, and engaging the gripping lever tending to swing the latter around its pivot when fluid under pressure is connected to the hose, increasing the gripping action of the lever, the resilient member also serving as a packing, the expansion of the same in response to internal pressure serving to increase the packing pressure.

6. A hose coupling for engagement with an automobile tire valve, consisting of a tubular body member having a slot parallel to the axis, a gripping lever in said slot, a pivot for said lever, a flexible hollow member within the body member and connected to the hose, and engaging the gripping lever, tending to swing the latter around its pivot when fluid under pressure is connected to the hose, the pivot being in the form of a split ring encircling the body member.

7. A hose coupling for engagement with an automobile tire valve, consisting of a tubular body member having a slot parallel to the axis, a gripping lever in said slot, a pivot for said lever, a flexible hollow member within the body member and connected to the hose and engaged by the gripping lever, tending to swing the latter around its pivot when fluid under pressure is connected to the hose, the gripping lever having an actuating arm at an angle and substantially parallel to the hose.

Signed by me at Baltimore, Maryland, this 22nd day of August, 1923.

WALTER M. INGRAM.